United States Patent
Roxbergh et al.

(10) Patent No.: US 11,593,059 B2
(45) Date of Patent: Feb. 28, 2023

(54) SYSTEMS AND METHODS FOR GENERATING RECOMMENDATIONS IN A DIGITAL AUDIO WORKSTATION

(71) Applicant: Spotify AB, Stockholm (SE)

(72) Inventors: Linus Karl Oskar Roxbergh, Stockholm (SE); Nils Marcus Sebek, Stockholm (SE); Björn Olov Valdemar Melinder, Stockholm (SE)

(73) Assignee: Spotify AB, Stockholm (SE)

( * ) Notice: Subject to any disclaimer, the term of this patent is extended or adjusted under 35 U.S.C. 154(b) by 267 days.

(21) Appl. No.: 17/003,831

(22) Filed: Aug. 26, 2020

(65) Prior Publication Data
US 2022/0066732 A1     Mar. 3, 2022

(51) Int. Cl.
G06F 3/16 (2006.01)
G06N 3/08 (2006.01)
G10H 1/00 (2006.01)

(52) U.S. Cl.
CPC .......... G06F 3/165 (2013.01); G06N 3/08 (2013.01); G10H 1/0008 (2013.01); G10H 1/0025 (2013.01); G10H 2220/101 (2013.01)

(58) Field of Classification Search
CPC ........ G06F 3/165; G06N 3/08; G10H 1/0008; G10H 1/0025; G10H 2220/101
USPC ........................................................ 84/625
See application file for complete search history.

(56) References Cited

U.S. PATENT DOCUMENTS

| | | | |
|---|---|---|---|
| 9,990,911 B1 * | 6/2018 | Lee | G06F 16/683 |
| 10,657,934 B1 * | 5/2020 | Kolen | G06N 3/084 |
| 2009/0013004 A1 * | 1/2009 | Manukyan | G06F 16/683 |
| 2010/0192755 A1 * | 8/2010 | Morris | G10H 1/0025 84/637 |
| 2021/0248376 A1 * | 8/2021 | Zhao | G06N 3/02 |
| 2021/0390644 A1 * | 12/2021 | Chen | G06Q 20/1235 |
| 2022/0066732 A1 * | 3/2022 | Roxbergh | G10H 1/0025 |
| 2022/0208155 A1 * | 6/2022 | Ivers | G10H 1/0008 |
| 2022/0208156 A1 * | 6/2022 | Chen | G06F 3/0483 |

FOREIGN PATENT DOCUMENTS

| | | | | |
|---|---|---|---|---|
| CN | 111081272 A | * | 4/2020 | G10H 1/0008 |
| CN | 113096624 A | * | 7/2021 | |
| WO | WO-2017067472 A1 | * | 4/2017 | G10H 1/0025 |
| WO | WO2017067472 A1 | | 4/2017 | |
| WO | WO-2020077262 A1 | * | 4/2020 | G06N 20/00 |
| WO | WO2020077262 A1 | | 4/2020 | |
| WO | WO-2021163377 A1 | * | 8/2021 | G05B 15/02 |
| WO | WO-2021168563 A1 | * | 9/2021 | A61B 5/16 |

* cited by examiner

*Primary Examiner* — Christina M Schreiber
(74) *Attorney, Agent, or Firm* — Morgan, Lewis & Bockius LLP

(57) ABSTRACT

A method includes displaying a user interface of a digital audio workstation, which includes a first region for generating a composition. The first region includes a first compositional segment that has been added to the composition by a user. Based on the first compositional segment, one or more recommended predefined compositional segments are identified and displayed in a second region. The method includes receiving the selection of a second compositional segment. The method includes adding the compositional segment to the composition.

26 Claims, 10 Drawing Sheets

700

| 710 | Display a user interface of a digital audio workstation (DAW) including a first region for generating a composition, wherein the first region includes a first compositional segment that has already been added to the composition by a user |

| 720 | Identify a first set of recommended predefined compositional segments based on combinations of compositional segments that other users have included in other compositions. |

| 730 | Represent a plurality of compositional segments as respective vectors in a vector space |

| 740 | Generate a first vector using the compositional segments that are present in the composition  (A) |

| 750 | Select the first set of one or more recommended predefined compositional segments from the plurality of compositional segments based on vector distances between the first vector and vectors representing respective ones of the plurality of compositional segments |

| 760 | Display a second region for recommending compositional segments including the first set of one or more recommended predefined compositional segments that are identified based on the first compositional segment that has already been added to the composition by the user |

| 770 | Receive a user selection of a second compositional segment from the first set of one or more recommended predefined compositional segments; and |

| 780 | Add the second compositional segment to the composition. |
| 790 | Update the second region to display a second set of one or more recommended predefined compositional segments that are identified based on the first compositional segment and the second compositional segment. |

FIG. 7A

SYSTEMS AND METHODS FOR GENERATING RECOMMENDATIONS IN A DIGITAL AUDIO WORKSTATION

TECHNICAL FIELD

The disclosed embodiments relate generally to generating recommendations in a digital audio workstation (DAW), and more particularly, to generating recommendations by analyzing the content already present in the user's workspace.

BACKGROUND

A digital audio workstation (DAW) is an electronic device or application software used for recording, editing and producing audio files. DAWs come in a wide variety of configurations from a single software program on a laptop, to an integrated stand-alone unit, all the way to a highly complex configuration of numerous components controlled by a central computer. Regardless of configuration, modern DAWs generally have a central interface that allows the user to alter and mix multiple recordings and tracks into a final produced piece.

DAWs are used for the production and recording of music, songs, speech, radio, television, soundtracks, podcasts, sound effects and nearly any other situation where complex recorded audio is needed. MIDI, which stands for "Musical Instrument Digital Interface" is a common data protocol used for storing and manipulating audio data using a DAW.

Conventional DAWs offer a piano roll graphical user interface (GUI). The term "piano roll" is used to refer to a graphical display of, and platform for editing, MIDI data. Through the piano roll GUI existing notes (e.g., notes recorded on a physical instrument or an external device, such as a keyboard) can be modified and new notes can be created and inserted into the audio composition. In addition to notes, in some circumstances, predefined compositional segments (referred to as "loops") can be added directly to the piano roll.

SUMMARY

Some DAWs allow users to select pre-recorded "loops" (e.g., digital recordings of instruments, referred to as "compositional segments" below) from a library to include in the composition. There are, however, typically thousands of loops to choose from, making it difficult to find audio files that are musically-suitable for the project.

Some embodiments of the present disclosure solve this problem by recommending relevant compositional segments based on compositional segments already present in the user's composition. The recommendations are updated as the user adds new compositional segments (e.g., from the recommendations) to the composition.

In some embodiments, relevant compositional segments are determined using a neural network trained on combinations of compositional segments that other users have included in their compositions. In some embodiments, the training is performed without regard to the content of the compositional segments. In some embodiments, the neural network outputs representations of the compositional segments as vectors in a vector space. Thus, similar compositional segments can be determined based on vector similarity (e.g., cosine similarity).

To that end, in accordance with some embodiments, a method is performed at an electronic device. The method includes displaying, on a device, a user interface of a digital audio workstation (DAW), the user interface for the DAW including a first region for generating a composition. The first region includes a first compositional segment that has already been added to the composition by a user. The method includes identifying, based on the first compositional segment that has already been added to the composition by the user, a first set of one or more recommended predefined compositional segments. The identifying is based on combinations of compositional segments that other users have included in other compositions. The method includes displaying, in the user interface of the DAW, a second region for recommending compositional segments. The second region includes the first set of one or more recommended predefined compositional segments that are identified based on the first compositional segment that has already been added to the composition by the user. The method includes receiving a user selection of a second compositional segment from the first set of one or more recommended predefined compositional segments. The method includes, in response to receiving the user selection of the second compositional segment, adding the second compositional segment to the composition.

Further, some embodiments provide an electronic device. The device includes one or more processors and memory storing one or more programs for performing any of the methods described herein.

Further, some embodiments provide a non-transitory computer-readable storage medium storing one or more programs configured for execution by an electronic device. The one or more programs include instructions for performing any of the methods described herein.

Thus, systems are provided with improved methods for generating audio content in a digital audio workstation.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 7A-7B are flow diagrams illustrating a method of displaying a user interface of a digital audio workstation (DAW), in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc., are, in some instances, used herein to describe various elements, these elements should not be limited by these terms. These terms are used only to distinguish one element from another. For example, a first user interface element could be termed a second user interface element, and, similarly, a second user interface element could be termed a first user interface element, without departing from the scope of the various described embodiments. The first user interface element and the second user interface element are both user interface elements, but they are not the same user interface element.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
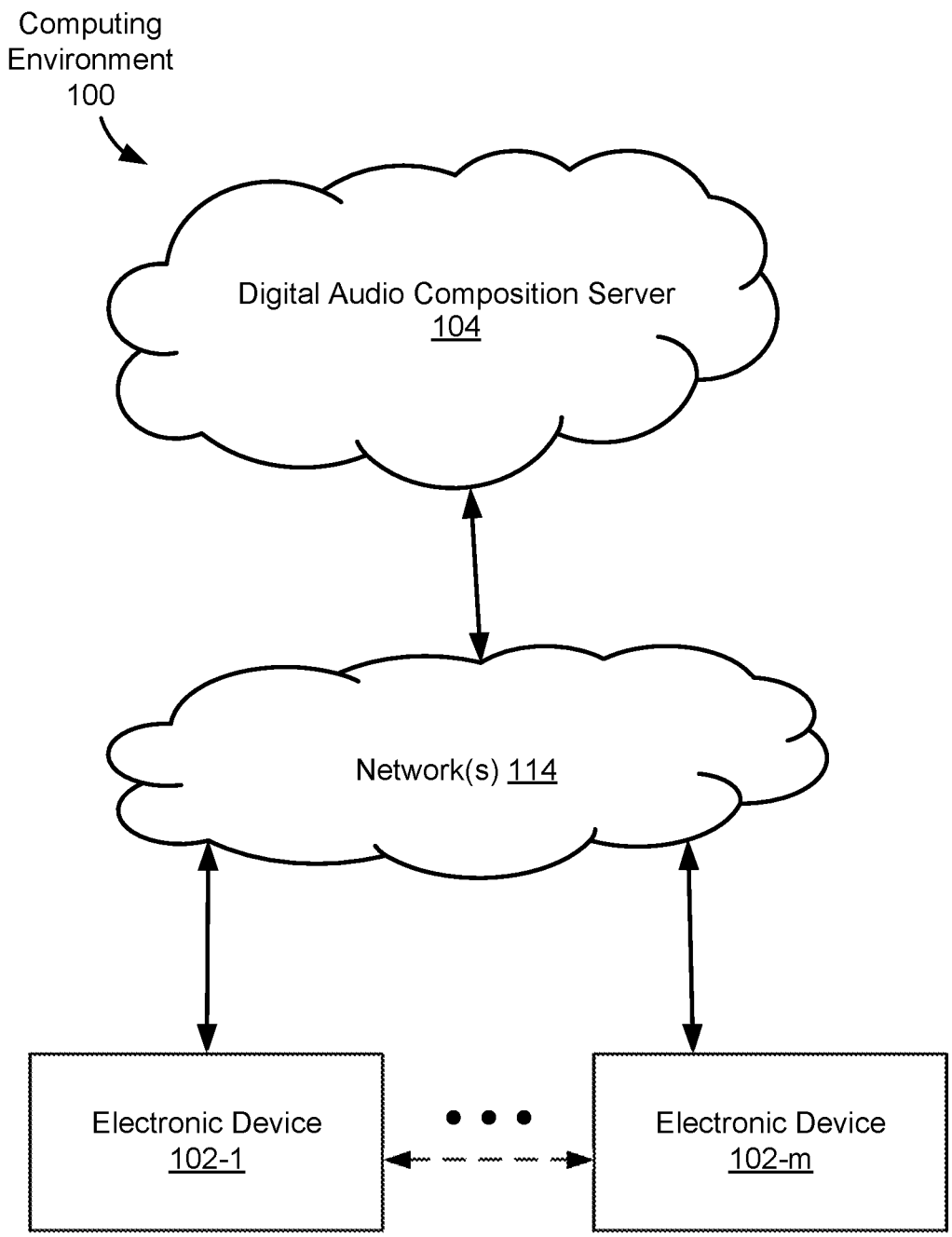
FIG. 1 is a block diagram illustrating a computing environment, in accordance with some embodiments.

FIG. 1 is a block diagram illustrating a computing environment 100, in accordance with some embodiments. The computing environment 100 includes one or more electronic devices 102 (e.g., electronic device 102-1 to electronic device 102-m, where m is an integer greater than one) and one or more digital audio composition servers 104.

The one or more digital audio composition servers 104 are associated with (e.g., at least partially compose) a digital audio composition service (e.g., for collaborative digital audio composition) and the electronic devices 102 are logged into the digital audio composition service. An example of a digital audio composition service is SOUNDTRAP, which provides a collaborative platform on which a plurality of users can modifying a collaborative composition.

One or more networks 114 communicably couple the components of the computing environment 100. In some embodiments, the one or more networks 114 include public communication networks, private communication networks, or a combination of both public and private communication networks. For example, the one or more networks 114 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices. In some embodiments, electronic device 102-1 (e.g., or electronic device 102-2 (not shown)) includes a plurality (e.g., a group) of electronic devices.

In some embodiments, electronic devices 102-1 and 102-m send and receive audio composition information through network(s) 114. For example, electronic devices 102-1 and 102-m send requests to add or remove notes, instruments, or effects to a composition, to 104 through network(s) 114.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless analog, such as those associated with personal-area-network (e.g., Bluetooth/Bluetooth Low Energy (BLE)) communication technologies, radio-frequency-based near-field communication technologies, infrared communication technologies, etc.) with electronic device 102-m. In some embodiments, electronic device 102-1 communicates with electronic device 102-m through network(s) 114. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a digital audio workstation application 222 (FIG. 2) that allows a respective user of the respective electronic device to upload (e.g., to digital audio composition server 104), browse, request (e.g., for playback at the electronic device 102), select (e.g., from a recommended list) and/or modify audio compositions (e.g., in the form of MIDI files).

Figure 2:
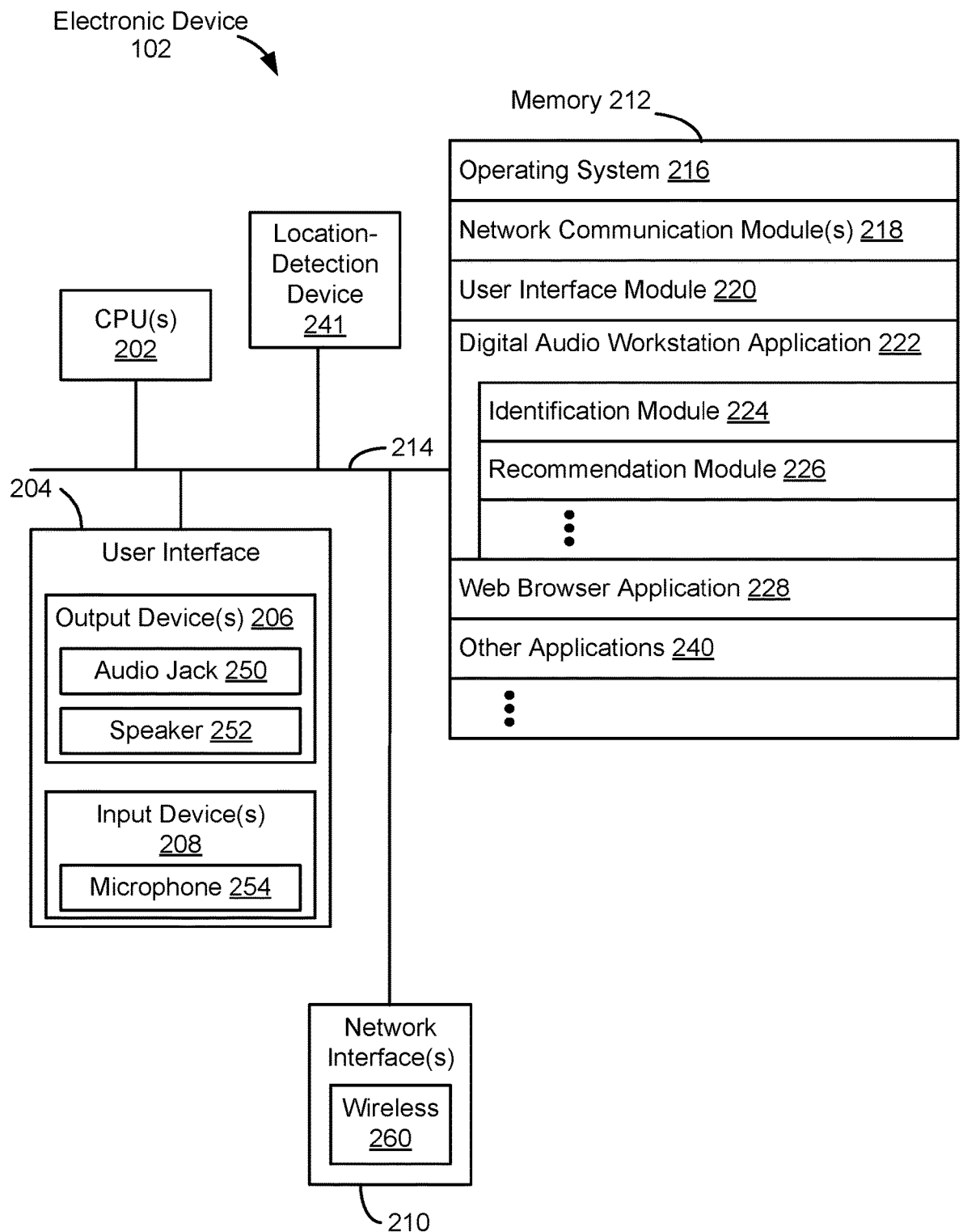
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard (e.g., a keyboard with alphanumeric characters), mouse, track pad, a MIDI input device (e.g., a piano-style MIDI controller keyboard) or automated fader board for mixing track volumes. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone 254) to capture audio (e.g., vocals from a user).

Optionally, the electronic device 102 includes a location-detection device 241, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a digital audio composition server 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the digital audio composition server 104 (via the one or more network(s) 114, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or digital audio composition server 104) via the one or more network interface(s) 210 (wired or wireless) connected to one or more network(s) 114;
- a user interface module 220 that receives commands and/or inputs from a user via the user interface 204 (e.g., from the input devices 208) and provides outputs for playback and/or display on the user interface 204 (e.g., the output devices 206);
- a digital audio workstation application 222 (e.g., recording, editing, suggesting and producing audio files such as musical composition). Note that, in some embodiments, the term "digital audio workstation" or "DAW" refers to digital audio workstation application 222 (e.g., a software component). In some embodiments, digital audio workstation application 222 also includes the following modules (or sets of instructions), or a subset or superset thereof:
  - an identification module 224 for analyzing the loops (e.g., compositional segments) present in a workspace on a graphical user interface and representing the loops as vectors in a vector space;
  - a recommendation module 226 recommends loops that are musically suitable with the loops already present in the workspace (e.g., by matching the vectors in the already present loops to loops in a database and recommending the loops with the closest vector distances).
- a web browser application 228 (e.g., Internet Explorer or Edge by Microsoft, Firefox by Mozilla, Safari by Apple, and/or Chrome by Google) for accessing, viewing, and/or interacting with web sites. In some embodiments, rather than digital audio workstation application 222 being a stand-alone application on electronic device 102, the same functionality is provided through a web browser logged into a digital audio composition service;
- other applications 240, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
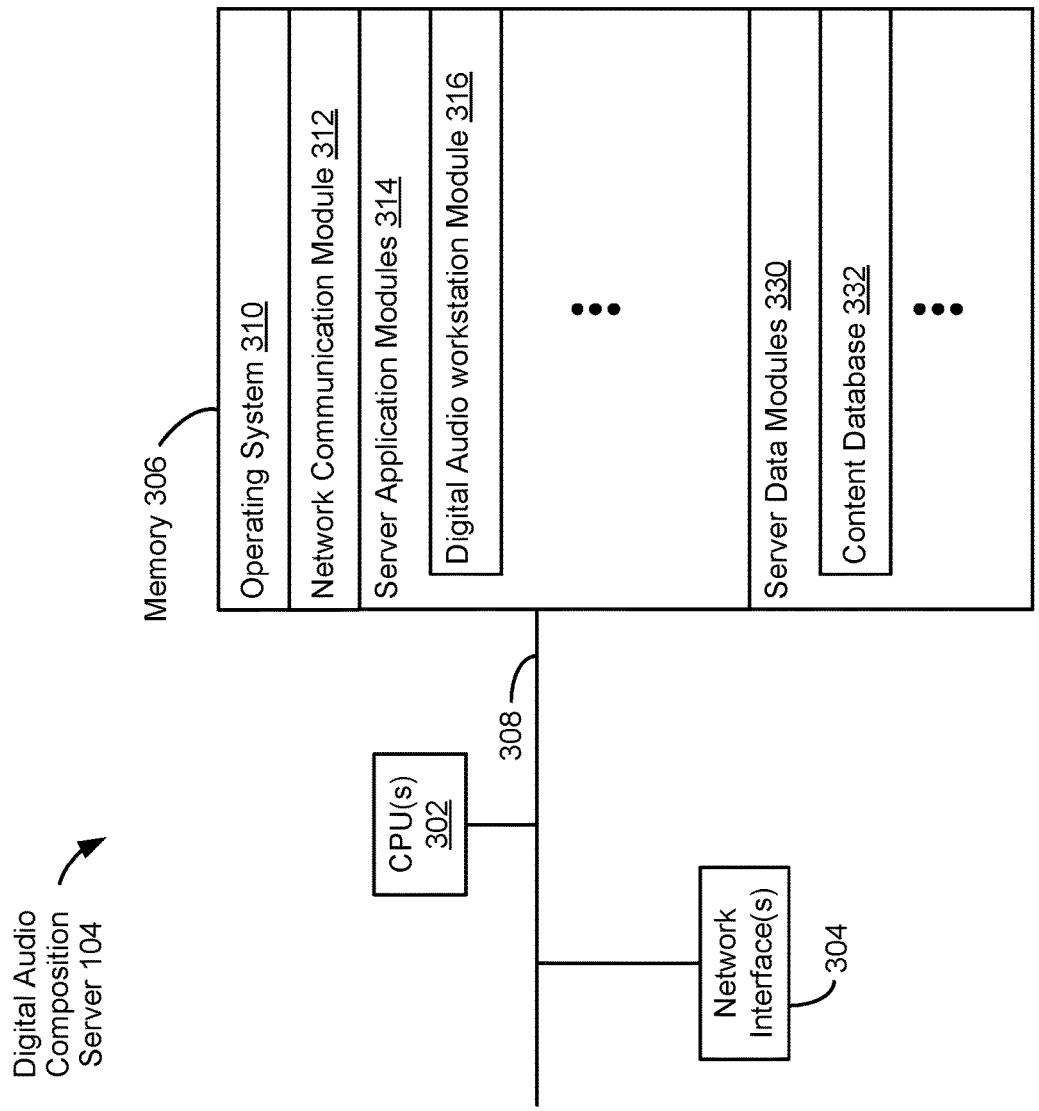
FIG. 3 is a block diagram illustrating a digital audio composition server, in accordance with some embodiments.

FIG. 3 is a block diagram illustrating a digital audio composition server 104, in accordance with some embodiments. The digital audio composition server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the digital audio composition server 104 to other computing devices via one or more network interfaces 304 (wired or wireless) connected to one or more networks 114;
- one or more server application modules 314 for performing various functions with respect to providing and managing a content service, the server application modules 314 including, but not limited to, one or more of:
  - digital audio workstation module 316 which may share any of the features or functionality of digital audio workstation module 222. In the case of digital audio workstation module 316, these features and functionality are provided to the client device 102 via, e.g., a web browser (web browser application 228);
- one or more server data module(s) 330 for handling the storage of and/or access to media items and/or metadata relating to the audio compositions; in some embodiments, the one or more server data module(s) 330 include a media content database 332 for storing audio compositions.

In some embodiments, the digital audio composition server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the digital audio composition server 104 in accordance with some embodiments, FIG. 3 is intended more as a functional description of the various features that may be present in one or more digital audio composition servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the digital audio composition server 104, and how features are allocated among them, will vary from one implementation to another and, optionally, depends in part on the amount of data traffic that the server system handles during peak usage periods as well as during average usage periods.

Figure 4:
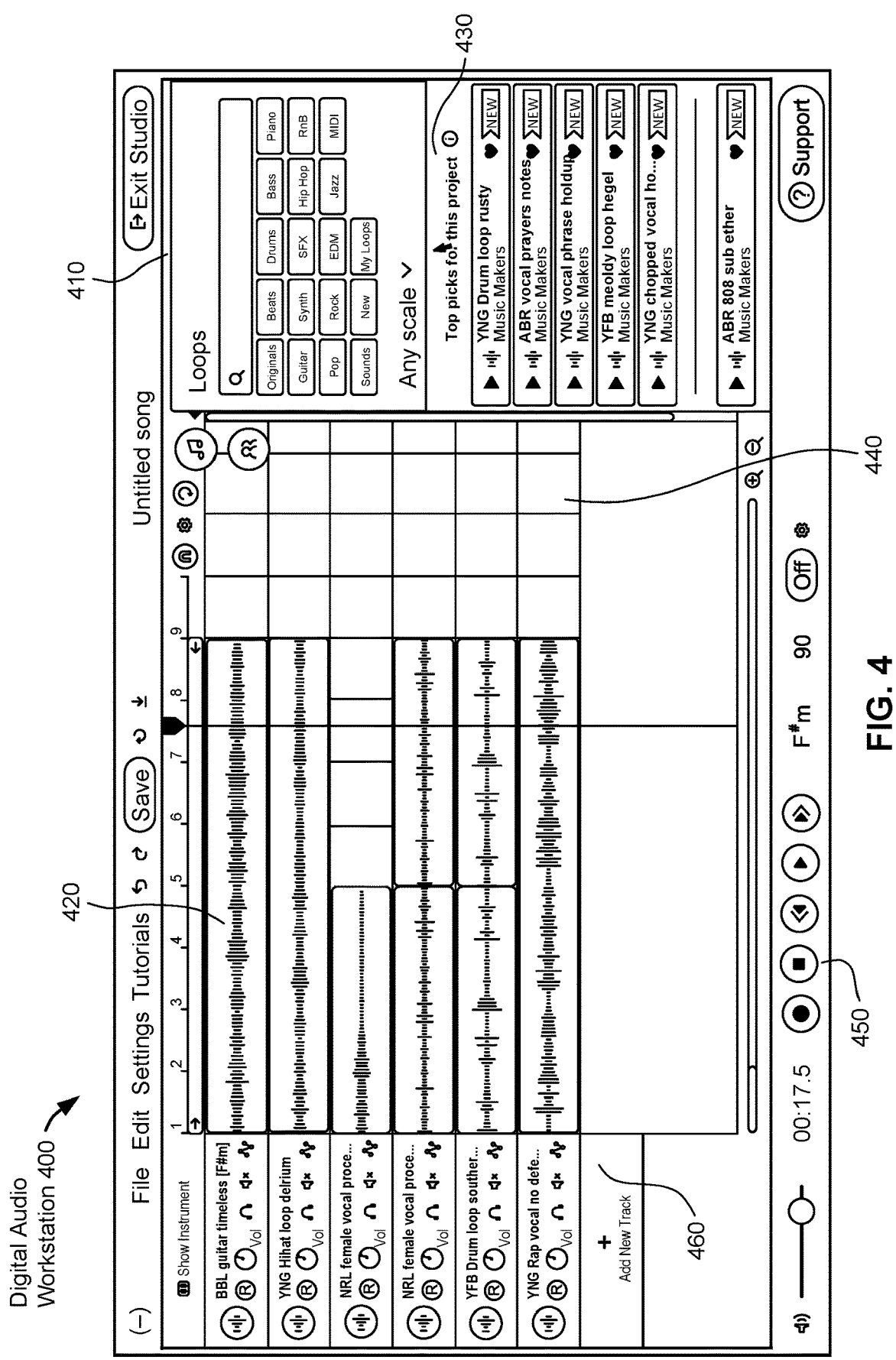
FIG. 4 illustrates an example of a graphical user interface for a digital audio workstation that includes a recommendation region, in accordance with some embodiments.

FIG. 4 illustrates an example of a graphical user interface 400 for a digital audio workstation (DAW) that includes a recommendation region 430, in accordance with some embodiments. In particular, FIG. 4 illustrates a graphical user interface 400 comprising a user workspace 440 (e.g., a piano roll). The user may add different compositional segments and edit the added compositional segments, referred to as loops 420. The one or more loops 420 together form a composition. In some embodiments, the one or more loops 420 have a temporal element wherein an individually specified loop is adjusted temporally to either reflect a shorter segment of the loop or is extended to create a repeating loop. In some embodiments, the loop is adjusted by dragging the loop forward or backward in the workspace 440. In some embodiments, the loop is cropped. In some embodiments, the loop is copied and pasted into the workspace 440 to create a repeating segment.

In some embodiments, compositional segments are edited by an instrument profile section 460. The instrument profile section 460 may comprise various clickable icons, in which the icons correspond to characteristics of the one or more loops 420. The icons may correspond to the volume, reverb, tone, etc. of the one or more loops 420. In some embodiments, the icons may correspond to a specific loop in the workspace 440, or the icons may correspond to the entire composition.

In some embodiments, additional predefined compositional segments (e.g., predefined loops) are identified based on one or more filters selected by the user. In some embodiments, the user enters text into a search box 410, and the DAW 400 recommends one or more filters that match the text. In some embodiments, the user selects search features for desired compositional segments in the search box 410. In some embodiments, the user may select from a predefined list of search features. In some embodiments, the user may input a word or phrase associated with a desired search feature into the search box 410. In some embodiments, the GUI may present recommended filters based on the one or more loops 420 currently present in the workspace. In some embodiments, the filters are instruments, genres, beats, or any searchable compositional characteristic thereof.

Additionally, the graphical user interface 400 includes a recommendation region 430. The recommendation region 430 includes a list of suggested compositional segments that the user can add (e.g., by clicking on the compositional track, dragging the compositional segment into the workspace 440, or by clicking on the "Add New Track" option in the instrument profile section 460). The recommendation region 430 generates a list of compositional segments that have vectors (as described below, with reference to method 700) that are closest in a vector-space to the vectors present in the loops 420 (e.g., determined using an average of the vectors present in the one or more loops, as described with reference to FIG. 9, below). In some embodiments, the recommendation region 430 generates the top ten predefined compositional segments that have vectors that are closest to the vectors present in the one or more loops 420. In some embodiments, the recommendation region 430 generates the top five predefined compositional segments that have vectors that are closest to the vectors present in the one or more loops 420.

In some embodiments, the DAW may comprise a lower region 450 for playing the one or more loops together, thereby creating a composition. In some embodiments, the lower region 450 may control playing, fast-forwarding, rewinding, pausing, and recording additional instruments in the composition.

Figure 5A:
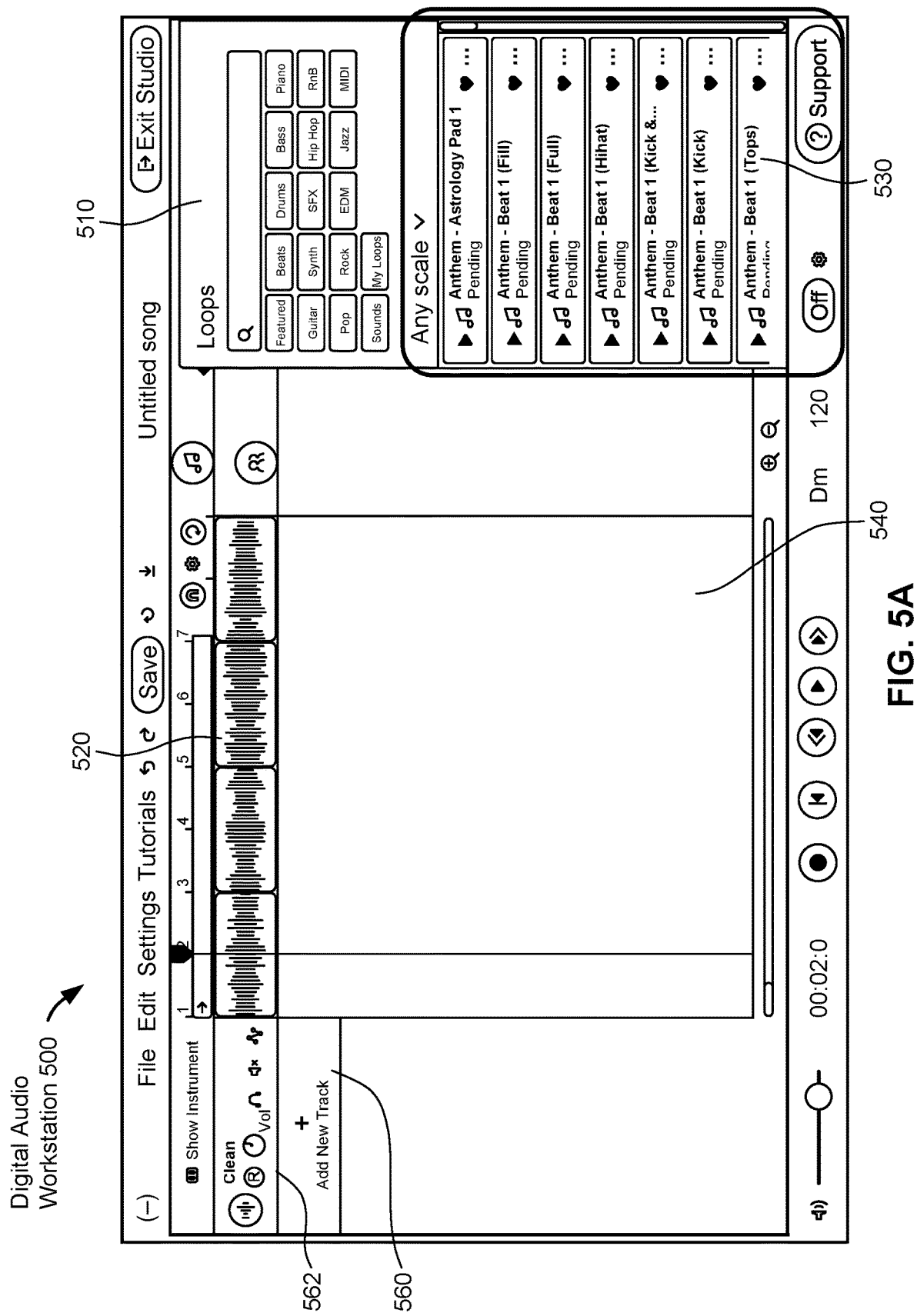
FIGS. 5A-5B illustrate examples of graphical user interfaces for a digital audio workstation that includes a recommendation region, in accordance with some embodiments.
Figure 5B:
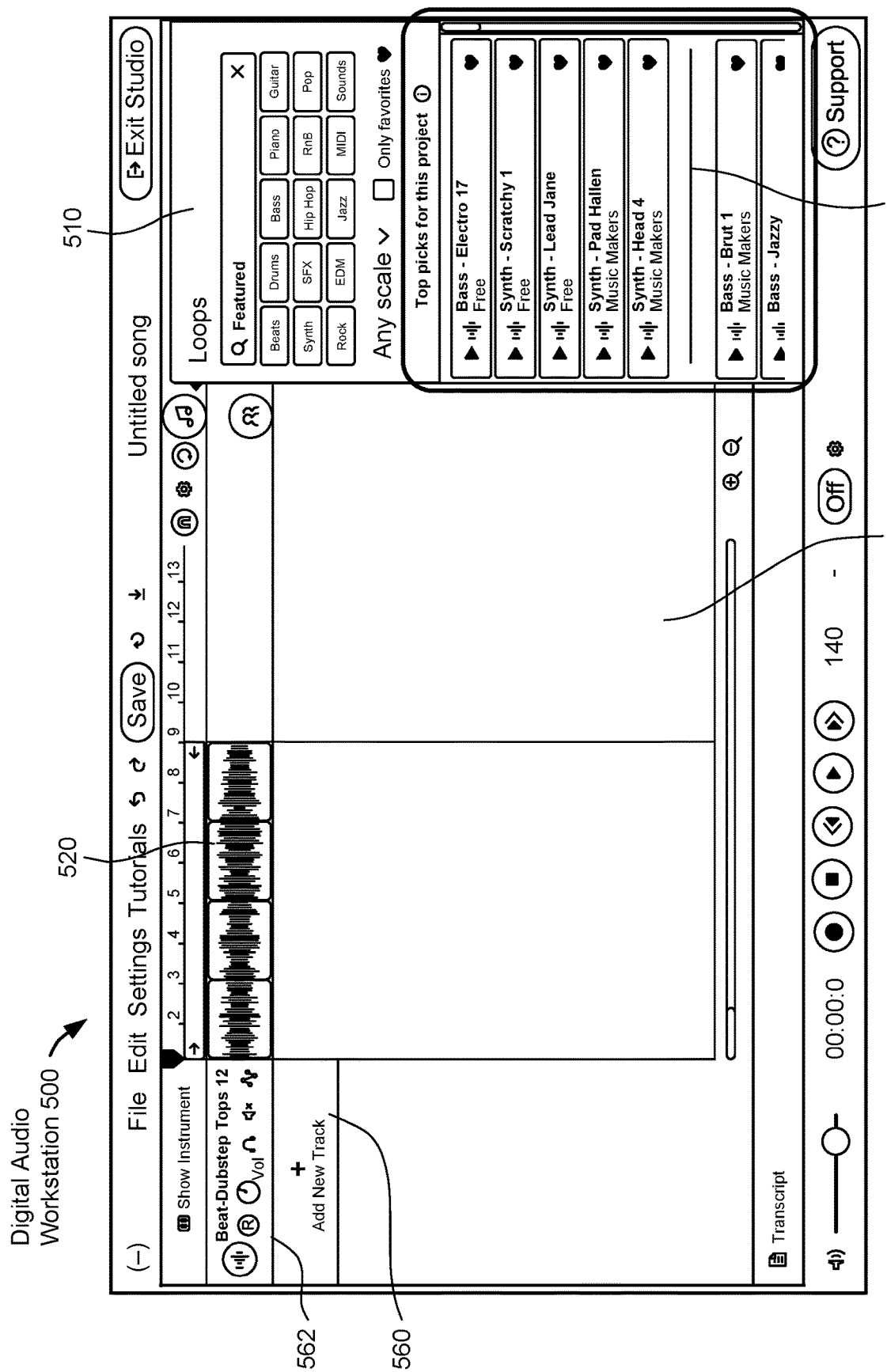

FIGS. 5A-5B illustrate examples of a graphical user interface 500 for a DAW that includes recommendation regions 530 and 535. The DAW includes a workspace 540 comprising a single loop 520. The single loop 520 has a corresponding instrument profile section 562. In some embodiments, a new compositional segment is added or a new composition is recorded by selecting the "Add New Track" icon 560. In some embodiments, the workspace 540 may include a region to browse loops. Specifically, FIGS. 5A-5B illustrate the searchability of various predefined compositions. In this example, the recommendation region 530 displays one or more predefined compositional segments that correspond to the single loop element 520.

FIG. 5B illustrates a "Featured" filter in the search box 510. In some embodiments, the "Featured" filter limits the recommendation region 535 to generate one or more compositional segments that have a "Featured" tag associated with the compositional segments. The "Featured" tag may correspond to the most popular compositional segments among all users. In some embodiments, the "Featured" tag is applied to one or more new compositional segments that have been recently added to the database. In some embodiments, the "Featured" tag corresponds (e.g., is applied) to sponsored compositional segments. In some embodiments, the "Featured" tag corresponds to compositional segments that are musically-suitable with the single loop element 520. In some embodiments, the "Featured" tag corresponds to one or more predefined compositional segments that are musically-suitable with several loops present in the workspace 540.

Figure 6:
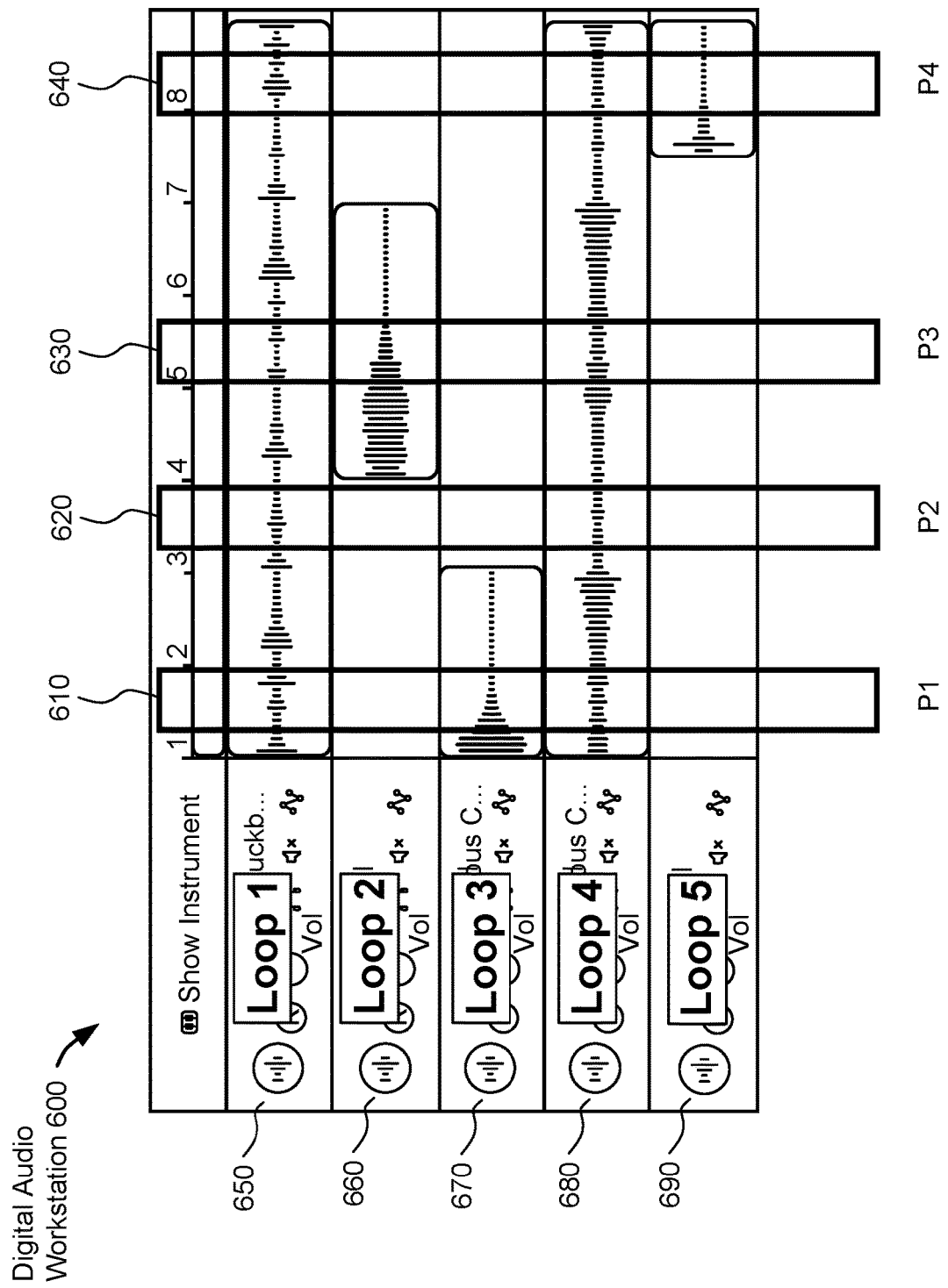
FIG. 6 illustrates an example of a graphical user interface for a DAW showing temporally-aligned loops present in a composition, in accordance with some embodiments.

FIG. 6 illustrates an example of a graphical user interface 600 for a DAW showing temporally-aligned loops present in a composition. FIG. 6 is described in greater detail in conjunction with FIGS. 8-9, below.

Figure 7B:
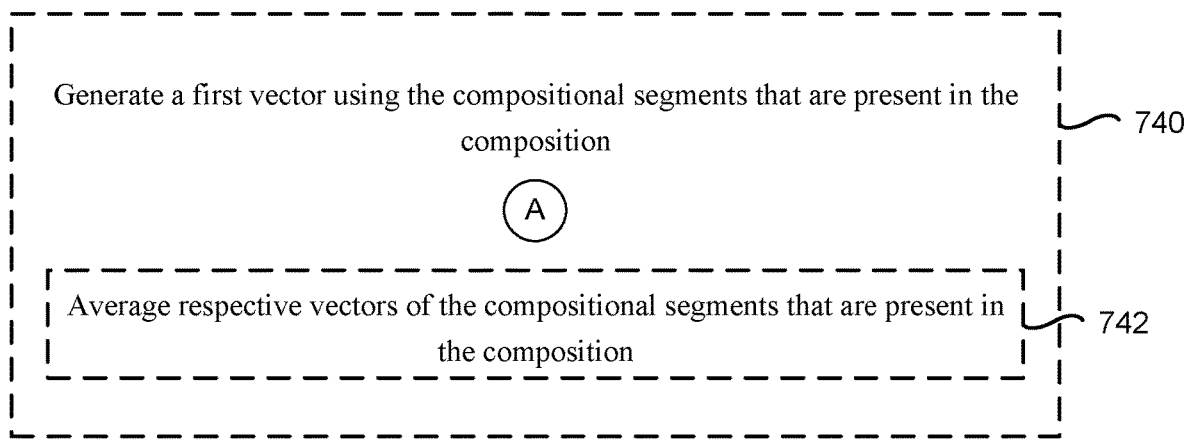

FIGS. 7A-7B are flow diagrams illustrating a method 700 of generating loop recommendations in a digital audio workstation (DAW), in accordance with some embodiments. Method 700 may be performed at an electronic device (e.g., electronic device 102). The electronic device includes a display, one or more processors, and memory storing instructions for execution by the one or more processors. In some embodiments, the method 700 is performed by executing instructions stored in the memory (e.g., memory 212, FIG. 2) of the electronic device. In some embodiments, the method 700 is performed by a combination of a server system (e.g., including digital audio composition server 104) and a client electronic device (e.g., electronic device 102, logged into a service provided by the digital audio composition server 104).

Method 700 includes displaying (710) a user interface of a digital audio workstation (DAW) including a first region for generating a composition, wherein the first region includes a first compositional segment that has already been added to the composition by a user. In some embodiments, the first region for generating a composition is a compositional region (e.g., a piano roll). In some embodiments, the first compositional segment is a loop. The loop may be one segment, or it may be multiple repeating segments.

In some embodiments, the audio composition is simultaneously-editable by a plurality of users.

In some embodiments, the displaying (710) further comprises identifying (720) a first set of recommended predefined compositional segments based on combinations of compositional segments that other users have included in other compositions. The identifying (720) may include representing (730) a plurality of compositional segments as respective vectors in a vector space. In some embodiments, the identifying further comprises generating (740) a first vector using the compositional segments that are present in the composition. In some embodiments, operation 740 is discussed further with reference to FIG. 7B. After generating (740), according to some embodiments, the method 700 further comprises selecting (750) the set of one or more recommended predefined compositional segments from the plurality of compositional segments based on the vector distances between the first vector and the vectors representing respective ones of the plurality of compositional segments. In some embodiments, the set of one or more recommended predefined compositional segments comprises a list of the top five predefined compositional segments that have vectors with the shortest vector distance from a vector representing the compositional segments present in the composition (e.g., an average, as described below). Alternatively, the set of one or more recommended predefined compositional segments comprises a list of the top ten predefined compositional segments that have vectors with the shortest vector distance from a vector representing the compositional segments present in the composition.

In some embodiments, method 700 further comprises displaying (760) a second region for recommending compositional segments including the first set of one or more recommended predefined compositional segments that are identified based on the first compositional segment that has already been added to the composition by the user.

In some embodiments, method 700 includes receiving (770) a user selection of a second compositional segment from the first set of one or more recommended predefined compositional segments.

In some embodiments, method 700 includes adding (780) the second compositional segment to the composition. Additionally to adding (780) the second composition, the second region is updated (790) to display a second set of one or more recommended predefined compositional segments that are identified based on the first compositional segment and the second compositional segment.

FIG. 7B provides additional steps to generating (740) the first vector using the compositional segments that are present in the composition. Specifically, an average (742) is taken of the respective vectors of the compositional segments that are present in the composition.

In some embodiments, method 700 includes generating a respective vector corresponding to each respective compositional segment of the plurality of compositional segments (e.g., in the library). In some embodiments, generating the respective vector corresponding to each respective compositional segment of the plurality of compositional segments includes applying, to an input of a neural network (e.g., a word2vec neural network), a unique identifier for the respective compositional segment, wherein the neural network is trained using data indicating combinations of compositional segments that other users have included in other compositions. In some embodiments, the unique identifier is not based on the content of the respective compositional segment (e.g., the unique identifier is an 8 digit number that is distinct from any content in the respective compositional segment).

In some embodiments, the neural network is a word2vec neural network. A word2vec neural network ("word2vec") is normally used to learn word associations from a large corpus of text. To do so, word2vec generates vectors representing words. The vectors are generated by word2vec such that high cosine similarity between two vectors correlates with a high semantic similarity between the words they represent. The neural network is trained to produce similar vectors for words that appear often together in sentences within the corpus of text.

Similarly, in some embodiments, a word2vec model is applied to DAWs such that compositional segments are treated as words, and combinations of compositional segments within compositions are treated as sentences. The corpus is formed by a collection of compositions created by various users. In some embodiments, the neural network is trained using data indicating temporally-aligned combinations of compositional segments that other users have included in other compositions (e.g., see FIG. 6 for an example of temporally-aligned loops). Stated another way, temporally-aligned compositions of compositional segments are treated as "sentences" in the word2vec model.

In some embodiments, the respective vector corresponding to each respective compositional segment is characterized by a dimension of at least 50. It has been found, unexpectedly, that using larger dimensional vectors (e.g., at least 50) results in better performance of the recommendation system.

Although FIGS. 7A-7B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 8:
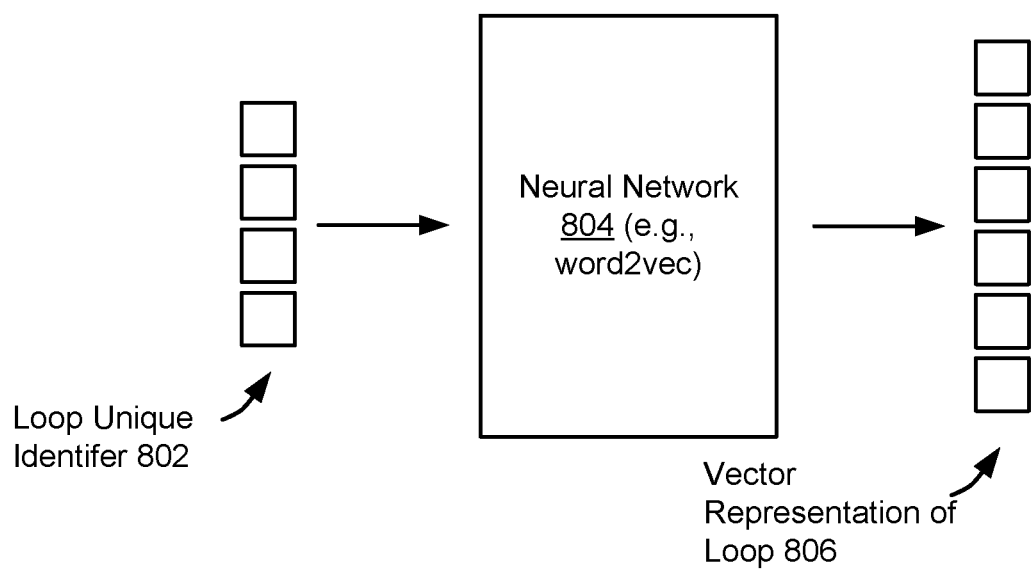
FIG. 8 illustrates a process for generating vectors corresponding to compositional segments, in accordance with some embodiments.

FIG. 8 illustrates a process for generating vectors corresponding to compositional segments (e.g., loops), in accordance with some embodiments. In some embodiments, a respective vector for each compositional segment in a library of compositional segments (e.g., stored in content database 332, FIG. 3) is generated using the process shown in FIG. 8. To that end, each compositional segment (e.g., loop) in the library of compositional segments is assigned a unique identifier 802. In some embodiments, the unique identifier is not based on content of the respective compositional segment (e.g., the unique identifier for the compositional segment is generated randomly and/or without regard for any content, such as notes, in the compositional segment).

The unique identifier 802 is provided as an input to a neural network 804, which outputs a vector 806 representing the compositional segment (e.g., vector 806 is a last layer, also known as an output layer, of neural network 804). The neural network is trained to output similar vectors (e.g., having a high cosine similarity) for compositional segments that tend to appear together in compositions. To that end, the neural network is trained using data indicating combinations of compositional segments that other users have included in other compositions. In some embodiments, the neural network is trained using data indicating temporally-aligned combinations of compositional segments that other users have included in other compositions (e.g., the neural network is trained to output similar vectors for compositional segments that tend to appear at the same time in compositions).

Note that, although unique identifier 802 is shown as a four digit identifier, unique identifier 802 may be any number of digits. In some embodiments, however, unique identifier 802 is not based on content of the compositional segment. Similarly, although vector representation 806 is shown as a 6 dimensional vector, in some embodiments, vector representation 806 may have any dimension (e.g., greater than 2). In some embodiments, vector representation 806 has a dimension greater than 50.

In some embodiments, the neural network 804 is a word2vec neural network. As noted above, unique identifiers for compositional segments are treated as "words" in the word2vec neural network. The corpus upon which the word2vec neural network is trained comprises compositions that have been made by other users. In some embodiments, temporally-aligned compositional segments within the corpus are used for training. FIG. 6 provides an example of extraction of training data from a composition. Four "sentences" on which to train the neural network are identified: P1 610, which includes Loop 1 (650), Loop 3 (670), and Loop 4 (680); P2 620, which includes Loop 1 (650) and Loop 4 (680); P3 630, which includes Loop 1 (650), Loop 2 (660), and Loop 4 (680); and P4 (640), which includes Loop 1 (650), Loop 4 (680), and Loop 5 (690). These four "sentences," (e.g., temporally-aligned combinations of compositional segments), as well as other temporally-aligned combinations of compositional segments that other users have included in other compositions, are used to train neural network 804.

Figure 9:
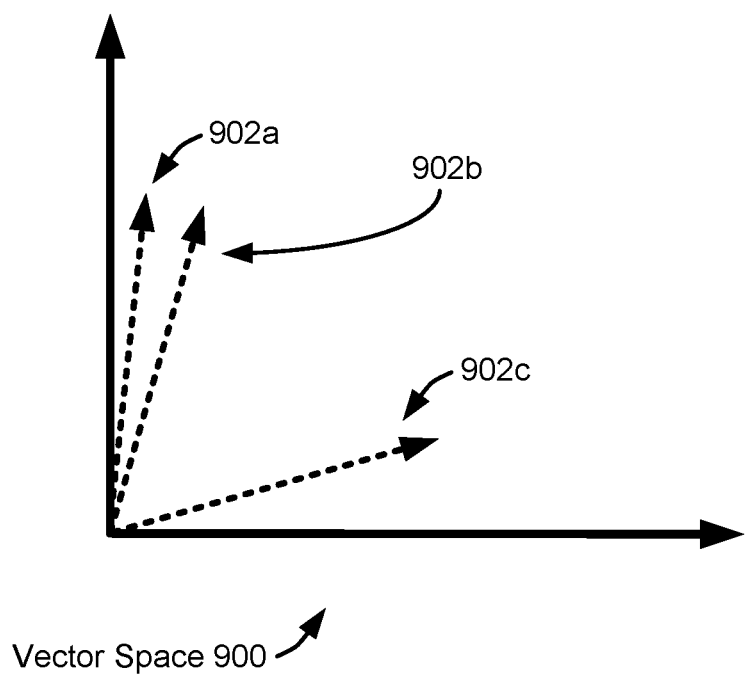
FIG. 9 illustrates a vector space that includes vector representations of compositional segments, in accordance with some embodiments.

After training, neural network 804 can be used to generate recommended compositional segments for future users' compositions. Consider the example shown in FIG. 5A, discussed above. A vector representation is generated for each compositional segment already added by the user (note that this may be done in advance, for all of the predefined compositional segments in the library). In some embodiments, the vector representations of each of the compositional segments already added by the user are averaged (e.g., added together and normalized). For example, FIG. 9 illustrates a vector space 900 that includes vector representations 902 of compositional segments, in accordance with some embodiments. In this example, vector representation 902*a* represents an individual compositional segment in the library; vector 902*c* represents another individual compositional segment in the library; and vector 902*b* represents the average of the vector representations already-present in a user's composition. Based on cosine similarity of their respective vectors, additional compositional segments are recommended to the user. For example, the compositional segment corresponding to vector representation 902*a* would be recommended to the user ahead of the compositional segment corresponding to representation 902*c*, because vector representation 902b has a greater cosine similarity to vector representation 902a than vector representation 902c.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    displaying, on a device, a user interface of a digital audio workstation (DAW), the user interface for the DAW including a first region for generating a composition, wherein the first region includes a first compositional segment that has already been added to the composition by a user;
    identifying, based on the first compositional segment that has already been added to the composition by the user, a first set of one or more recommended predefined compositional segments using a model that is trained on combinations of compositional segments that other users have selected to be included in other compositions;
    displaying, in the user interface of the DAW, a second region for recommending compositional segments, wherein the second region includes the first set of one or more recommended predefined compositional segments that are identified based on the first compositional segment that has already been added to the composition by the user;
    receiving a user selection of a second compositional segment from the first set of one or more recommended predefined compositional segments; and
    in response to receiving the user selection of the second compositional segment, adding the second compositional segment to the composition.

2. The method of claim 1, further comprising:
    in response to receiving the user selection of the second compositional segment, updating the second region to display a second set of one or more recommended predefined compositional segments that are identified based on the first compositional segment and the second compositional segment.

3. The method of claim 1, wherein identifying, based on the first compositional segment that has already been added to the composition by the user, the first set of one or more recommended predefined compositional segments includes:
    representing a plurality of compositional segments, including the first set of one or more recommended predefined compositional segments, as respective vectors in a vector space;
    generating a first vector using compositional segments, including the first compositional segment, that are present in the composition; and
    selecting the first set of one or more recommended predefined compositional segments from the plurality of compositional segments based on vector distances between the first vector and vectors representing respective ones of the plurality of compositional segments.

4. The method of claim 3, wherein generating the first vector using the compositional segments that are present in the composition comprises averaging respective vectors of the compositional segments that are present in the composition.

5. The method of claim 3, further including:
    generating a respective vector corresponding to each respective compositional segment of the plurality of compositional segments by applying, to an input of a neural network, a unique identifier for the respective compositional segment.

6. The method of claim 5, wherein the neural network is a word2vec neural network.

7. The method of claim 5, wherein the unique identifier is not based on content of the respective compositional segment.

8. The method of claim 5, wherein the neural network is trained using data indicating temporally-aligned combinations of compositional segments that other users have included in other compositions.

9. The method of claim 5, wherein the respective vector corresponding to each respective compositional segment of the plurality of compositional segments is characterized by a dimension of at least 50.

10. A system, comprising:
    a device comprising one or more processors; and
    a display comprising a user interface of a digital audio workstation (DAW), the user interface for the DAW including:
        a first region for generating a composition, wherein the first region includes a first compositional segment that has already been added to the composition by a user;
        a first set of one or more recommended predefined compositional segments, wherein the first set is identified based on the first compositional segment that has already been added to the composition by the user using a model that is trained on combinations of compositional segments that other users have selected to be included in other compositions; and
        a second region displayed in the user interface of the DAW for recommending compositional segments, wherein the second region includes the first set of one or more recommended predefined compositional segments that are identified based on the first compositional segment that has already been added to the composition by the user, wherein a user selection of a second compositional segment from the first set of one or more recommended predefined compositional segments is received, an in response to receiving the user selection of the second compositional segment, the second compositional segment is added to the composition.

11. The system of claim 10, wherein the user interface for the DAW further includes:
    a second set of one or more recommended predefined compositional segments displayed in the second region, wherein the second region is updated in response to receiving the user selection of the second compositional segment, wherein the second set of one or more recommended predefined compositional segments are identified based on the first compositional segment and the second compositional segment.

12. The system of claim 10, wherein:
    a plurality of compositional segments, including the first set of one or more recommended predefined compositional segments, are represented as respective vectors in a vector space, a first vector is generated using the compositional segments that are present in the composition, and the first set of one or more recommended predefined compositional segments is selected from the plurality of compositional segments based on vector distances between the first vector and vectors representing respective ones of the plurality of compositional segments.

13. The system of claim 12, further including memory storing:

a unique identifier for a respective compositional segment, wherein a respective vector corresponding to each respective compositional segment of the plurality of compositional segments is generated, wherein a neural network is trained using data indicating combinations of compositional segments that other users have included in other compositions.

14. The system of claim 13, wherein the neural network is a word2vec neural network.

15. The system of claim 13, wherein the unique identifier is not based on content of the respective compositional segment.

16. The system of claim 13, wherein the neural network is trained using data indicating temporally-aligned combinations of compositional segments that other users have included in other compositions.

17. The system of claim 13, wherein the respective vector corresponding to each respective compositional segment of the plurality of compositional segments is characterized by a dimension of at least 50.

18. A non-transitory computer-readable storage medium containing program instructions for causing a computer to perform a method of:

displaying, on a device, a user interface of a digital audio workstation (DAW), the user interface for the DAW including a first region for generating a composition, wherein the first region includes a first compositional segment that has already been added to the composition by a user;

identifying, based on the first compositional segment that has already been added to the composition by the user, a first set of one or more recommended predefined compositional segments using a model that is trained on combinations of compositional segments that other users have selected to be included in other compositions;

displaying, in the user interface of the DAW, a second region for recommending compositional segments, wherein the second region includes the first set of one or more recommended predefined compositional segments that are identified based on the first compositional segment that has already been added to the composition by the user;

receiving a user selection of a second compositional segment from the first set of one or more recommended predefined compositional segments; and in response to receiving the user selection of the second compositional segment, adding the second compositional segment to the composition.

19. The non-transitory computer-readable storage medium of claim 18, wherein the method further comprises:

in response to receiving the user selection of the second compositional segment, updating the second region to display a second set of one or more recommended predefined compositional segments that are identified based on the first compositional segment and the second compositional segment.

20. The non-transitory computer-readable storage medium of claim 18, wherein identifying, based on the first compositional segment that has already been added to the composition by the user, the first set of one or more recommended predefined compositional segments includes:

representing a plurality of compositional segments, including the first set of one or more recommended predefined compositional segments, as respective vectors in a vector space;

generating a first vector using compositional segments, including the first compositional segment, that are present in the composition; and selecting the first set of one or more recommended predefined compositional segments from the plurality of compositional segments based on vector distances between the first vector and vectors representing respective ones of the plurality of compositional segments.

21. The non-transitory computer-readable storage medium of claim 20, wherein generating the first vector using the compositional segments that are present in the composition comprises averaging respective vectors of the compositional segments that are present in the composition.

22. The non-transitory computer-readable storage medium of claim 20, wherein the method further comprises:

generating a respective vector corresponding to each respective compositional segment of the plurality of compositional segments by applying, to an input of a neural network, a unique identifier for the respective compositional segment, wherein the neural network is trained using data indicating combinations of compositional segments that other users have included in other compositions.

23. The non-transitory computer-readable storage medium of claim 22, wherein the neural network is a word2vec neural network.

24. The non-transitory computer-readable storage medium of claim 22, wherein the unique identifier is not based on content of the respective compositional segment.

25. The non-transitory computer-readable storage medium of claim 22, wherein the neural network is trained using data indicating temporally-aligned combinations of compositional segments that other users have included in other compositions.

26. The non-transitory computer-readable storage medium of claim 22, wherein the respective vector corresponding to each respective compositional segment of the plurality of compositional segments is characterized by a dimension of at least 50.

* * * * *